United States Patent
Liu et al.

(10) Patent No.: US 11,397,448 B2
(45) Date of Patent: Jul. 26, 2022

(54) NOTEBOOK COMPUTER WITH A FUNCTIONAL BODY

(71) Applicants: Han-Tsai Liu, Taipei (TW); Chih-Wen Chiang, Taipei (TW); Jyh-Chyang Tzou, Taipei (TW); Hsin Yeh, Taipei (TW); Yao-Hsien Yang, Taipei (TW); Cheng-Ya Chi, Taipei (TW)

(72) Inventors: Han-Tsai Liu, Taipei (TW); Chih-Wen Chiang, Taipei (TW); Jyh-Chyang Tzou, Taipei (TW); Hsin Yeh, Taipei (TW); Yao-Hsien Yang, Taipei (TW); Cheng-Ya Chi, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 0 days.

(21) Appl. No.: 16/547,614

(22) Filed: Aug. 22, 2019

(65) Prior Publication Data
US 2020/0064884 A1 Feb. 27, 2020

Related U.S. Application Data

(60) Provisional application No. 62/722,179, filed on Aug. 24, 2018.

(51) Int. Cl.
*G06F 1/16* (2006.01)
*G06F 1/20* (2006.01)

(52) U.S. Cl.
CPC .......... *G06F 1/1616* (2013.01); *G06F 1/1624* (2013.01); *G06F 1/1637* (2013.01);
(Continued)

(58) Field of Classification Search
CPC .... G06F 1/1616; G06F 1/1624; G06F 1/1637; G06F 1/1662; G06F 1/1681; G06F 1/203
See application file for complete search history.

(56) References Cited

U.S. PATENT DOCUMENTS 4,960,256 A * 10/1990 Chihara ................ G06F 1/1616
248/286.1
5,085,394 A * 2/1992 Torii ..................... G06F 1/1616
248/455
(Continued)

FOREIGN PATENT DOCUMENTS

| CN | 207182152 | 4/2018 |
|----|-----------|--------|
| TW | M280496 | 11/2005 |
| TW | I528142 | 4/2016 |

OTHER PUBLICATIONS

"Office Action of Taiwan Counterpart Application", dated Jan. 30, 2020, pp. 1-7.

*Primary Examiner* — Abhishek M Rathod
*Assistant Examiner* — Keith DePew
(74) *Attorney, Agent, or Firm* — JCIPRNET

(57) ABSTRACT

Provided is a notebook computer with a functional body, including a host, a functional body and a display body. The host has a keyboard portion and a receiving portion, and a height difference is formed between the keyboard portion and the receiving portion. The functional body has a first end and a second end. The first end is in pivot connection to the keyboard portion of the host. The display body has a display portion and a base. The second end of the functional body is in pivot connection to the display body. The display body is adapted to be rotated relative to the host and the functional body, so that the base is in contact with the receiving portion to switch to a folded state or a first unfolded state. The functional body is adapted to be rotated relative to the host, so that the base of the display body is relatively away from the receiving portion to switch to a second unfolded state.

17 Claims, 13 Drawing Sheets

(52) U.S. Cl.
CPC .......... *G06F 1/1662* (2013.01); *G06F 1/1681* (2013.01); *G06F 1/203* (2013.01)

(56) References Cited

U.S. PATENT DOCUMENTS

| | | | |
|---|---|---|---|
| 6,262,885 B1 * | 7/2001 | Emma | G06F 1/1618 361/679.05 |
| 6,266,241 B1 * | 7/2001 | Van Brocklin | G06F 1/1616 361/679.46 |
| 6,341,061 B1 * | 1/2002 | Eisbach | G06F 1/1616 312/223.2 |
| 6,392,871 B1 * | 5/2002 | Yanase | G06F 1/162 345/905 |
| 6,487,068 B1 * | 11/2002 | Rahemtulla | G06F 1/1679 361/679.04 |
| 7,503,538 B2 * | 3/2009 | Liou | G06F 1/1601 248/447 |
| 7,864,524 B2 * | 1/2011 | Ladouceur | G06F 3/0221 361/679.55 |
| 8,654,520 B2 * | 2/2014 | Lin | G06F 1/1624 361/679.27 |
| 8,749,969 B2 | 6/2014 | Yang et al. | |
| 8,780,544 B2 * | 7/2014 | Liang | G06F 1/1683 361/679.26 |
| 8,902,585 B2 * | 12/2014 | Tseng | G06F 1/1607 361/679.55 |
| 8,937,803 B2 * | 1/2015 | Hung | G06F 3/02 361/679.08 |
| 8,995,117 B1 * | 3/2015 | Hayashida | G06F 1/1616 361/679.27 |
| 9,086,853 B2 * | 7/2015 | Hu | G06F 1/162 |
| 9,201,466 B2 * | 12/2015 | Lai | G06F 1/1681 |
| 9,207,712 B1 * | 12/2015 | McAlpine | G06F 1/162 |
| 9,405,325 B2 * | 8/2016 | Kim | G06F 1/1679 |
| 9,441,714 B2 * | 9/2016 | Hsu | F16H 21/44 |
| 9,715,251 B2 * | 7/2017 | Chung | G06F 1/1643 |
| 9,841,794 B2 * | 12/2017 | Qin | G06F 1/1683 |
| 10,620,671 B2 * | 4/2020 | Lai | G06F 1/1681 |
| 2003/0103324 A1 * | 6/2003 | Gallivan | G06F 1/1683 361/679.27 |
| 2003/0142474 A1 * | 7/2003 | Karidis | G06F 1/1616 361/679.06 |
| 2006/0256512 A1 * | 11/2006 | Esther Kang | G06F 1/162 361/679.05 |
| 2007/0041773 A1 * | 2/2007 | Pirila | H04M 1/0247 400/680 |
| 2008/0174942 A1 * | 7/2008 | Yang | H04M 1/0214 361/679.27 |
| 2011/0176261 A1 * | 7/2011 | Wu | H04M 1/0237 361/679.01 |
| 2011/0216483 A1 * | 9/2011 | Vesely | G06F 1/1624 361/679.01 |
| 2012/0217855 A1 * | 8/2012 | Chen | G06F 1/1616 312/323 |
| 2013/0069878 A1 * | 3/2013 | Li | G06F 1/1616 345/168 |
| 2013/0182396 A1 * | 7/2013 | Hu | H05K 5/0226 361/729 |
| 2014/0029189 A1 * | 1/2014 | Chang | G06F 1/1679 361/679.11 |
| 2014/0139990 A1 * | 5/2014 | Moser | G06F 1/1654 361/679.11 |
| 2014/0347805 A1 * | 11/2014 | Wang | G06F 1/1616 361/679.27 |
| 2014/0375194 A1 * | 12/2014 | Arima | G06F 1/1601 312/322 |
| 2018/0340648 A1 * | 11/2018 | Chu | G03B 17/02 |
| 2020/0081498 A1 * | 3/2020 | Chang | G06F 1/1616 |
| 2020/0133336 A1 * | 4/2020 | Wang | G06F 1/1616 |

* cited by examiner

NOTEBOOK COMPUTER WITH A FUNCTIONAL BODY

CROSS-REFERENCE TO RELATED APPLICATION

This application claims the priority benefit of U.S. provisional application Ser. No. 62/722,179, filed on Aug. 24, 2018 The entirety of the above-mentioned patent application is hereby incorporated by reference herein and made a part of this specification.

BACKGROUND OF THE INVENTION

1. Field of the Invention

The present invention relates to a notebook computer, in particular, to a notebook computer with a functional body, which can be switched to different modes to meet different requirements.

2. Description of Related Art

A notebook computer is favorable for office work due to the properties of being light, thin, short and small and convenient to carry. The notebook computer consists of a display screen and a host, and the display screen can be pivoted relative to the host and unfolded to 180 degrees. A display screen of a notebook computer in the prior art is too close to a keyboard. When the notebook computer is placed on a desktop, the center position of the display screen may be lower than a horizontal line of sight of a user. Therefore, most users need to bow their heads to lower the line of sight in order to watch the screen. However, the head-down use posture is an incorrect operation posture, which has violated the ergonomics. In the long run, ache in the shoulders and neck will be caused, resulting in injury to the body of the user.

To this end, a notebook computer that can adjust the height and angle of a display screen according to the needs of a user needs to be developed, to avoid the injury to the body of the user and also provide diversified use situations.

SUMMARY OF THE INVENTION

The present invention provides a notebook computer with a functional body, which can freely adjust unfolded states in different heights and angles to adapt to diversified use situations of a user.

The notebook computer with a functional body of the present invention includes a host, the functional body and a display body. The host has a keyboard portion and a receiving portion, and there is a height difference between the keyboard portion and the receiving portion. The functional body has a first end and a second end. The first end is in pivot connection to the keyboard portion of the host. The display body has a display portion and a base. The second end of the functional body is in pivot connection to the display body. The display body is adapted to be rotated relative to the host and the functional body, so that the base is in contact with the receiving portion to switch to a folded state or a first unfolded state. The functional body is adapted to be rotated relative to the host, so that the base of the display body is relatively away from the receiving portion to switch to a second unfolded state.

The notebook computer with a functional body of the present invention includes a host, a functional body and a display body. The host has a keyboard portion and a receiving portion, and there is a height difference between the keyboard portion and the receiving portion. The functional body has a first end and a second end. The first end is in pivot connection to the keyboard portion of the host. The display body has a display portion and a base. The second end of the functional body is in pivot connection to the display body. When the display body is in a first unfolded state, a bottom side of the base abuts against a top surface of the receiving portion, and the base is suitable for translating along the top surface of the receiving portion.

Based on the above, according to the notebook computer with a functional body of the present invention, the display body thereof is adapted to be rotated relative to the host and the functional body, and the base of the display body is in contact with the receiving portion of the host to switch to the first unfolded state. This is similar to a use mode of a common notebook computer, and a difference is that the base may translate along the receiving portion of the host to adjust the angle of the display body, and the display body also drives the functional body to be relatively away from the receiving portion at the same time to allow both the display body and the functional body to obliquely face the user, which is contributive to use and operation at a close distance. Further, the functional body is adapted to be continuously rotated relative to the host, so that the base of the display body is relatively away from the receiving portion to switch to the second unfolded state. In this state, the horizontal height of the display body is increased, and the user is allowed to horizontally directly watch the display body at a remote distance, so as to correct an incorrect watching posture with the neck bent down and alleviate the phenomenon of ache in the shoulders and neck and injury to the body under long-time use.

In order to make the aforementioned and other objectives and advantages of the present invention comprehensible, embodiments accompanied with figures are described in detail below.

DESCRIPTION OF THE EMBODIMENTS

Figure 1A:
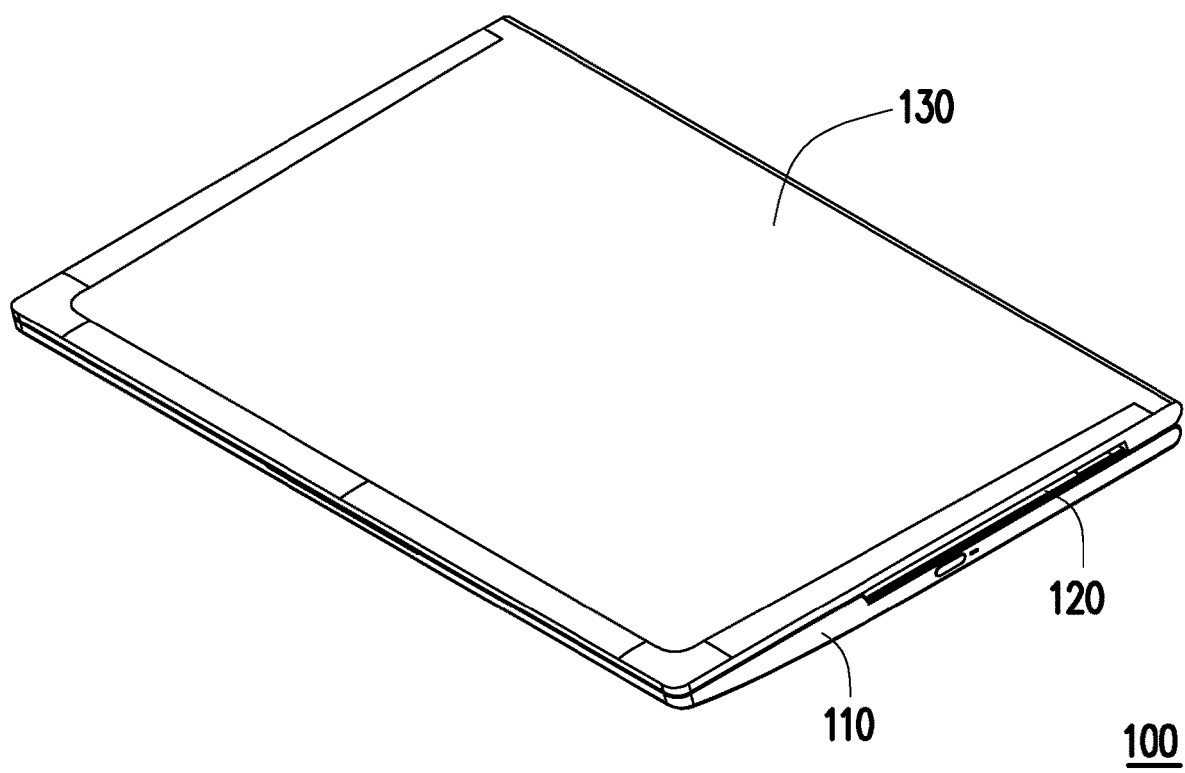
FIG. 1A is a three-dimensional schematic diagram of a folded state of a notebook computer with a functional body according to one embodiment of the present invention.
Figure 1B:
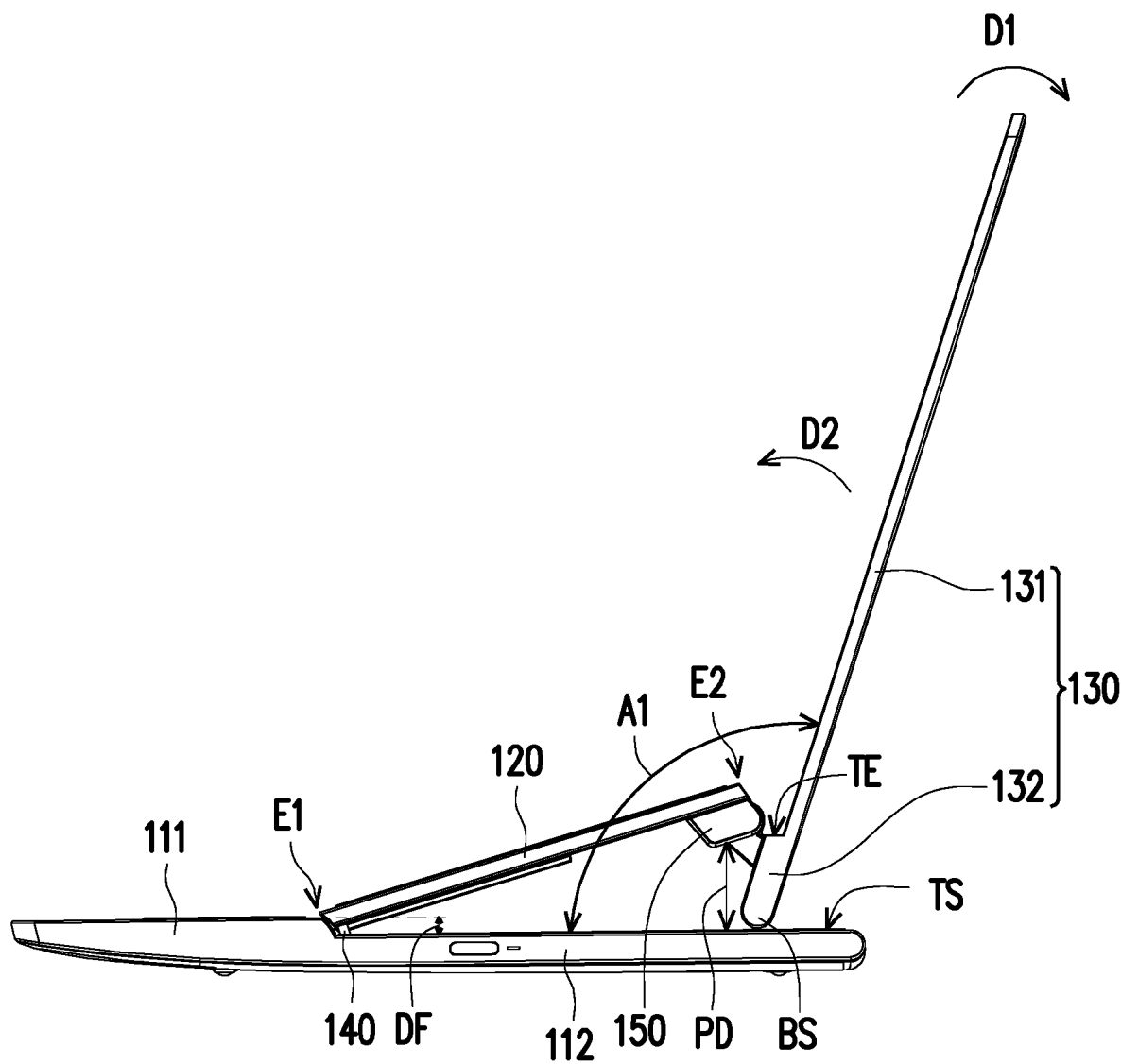
FIG. 1B is a side-view planar schematic diagram of a first unfolded state of the notebook computer with a functional body of FIG. 1A.
Figure 1C:
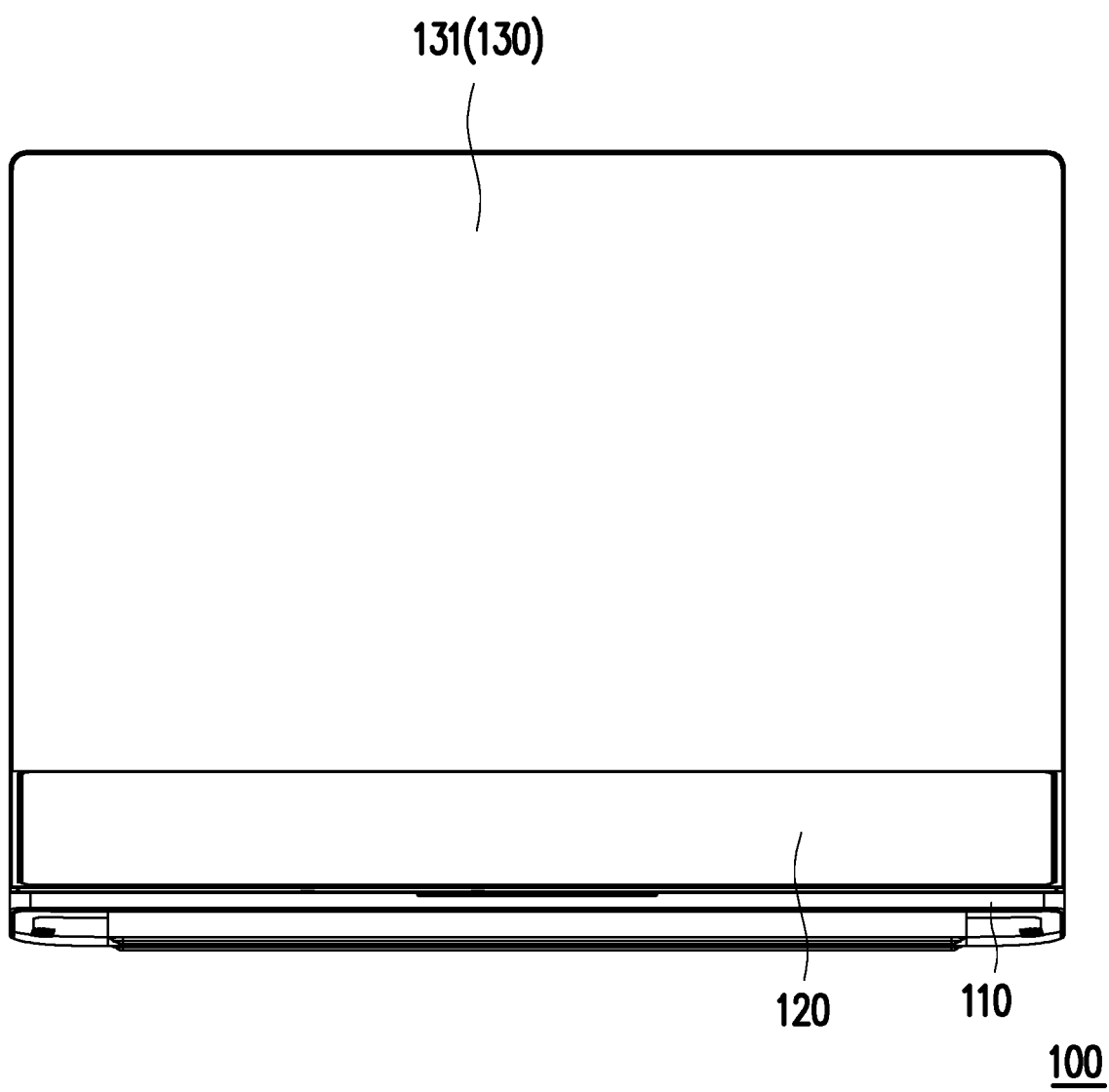
FIG. 1C is a front-view planar schematic diagram of the notebook computer with a functional body of FIG. 1B.
Figure 1D:
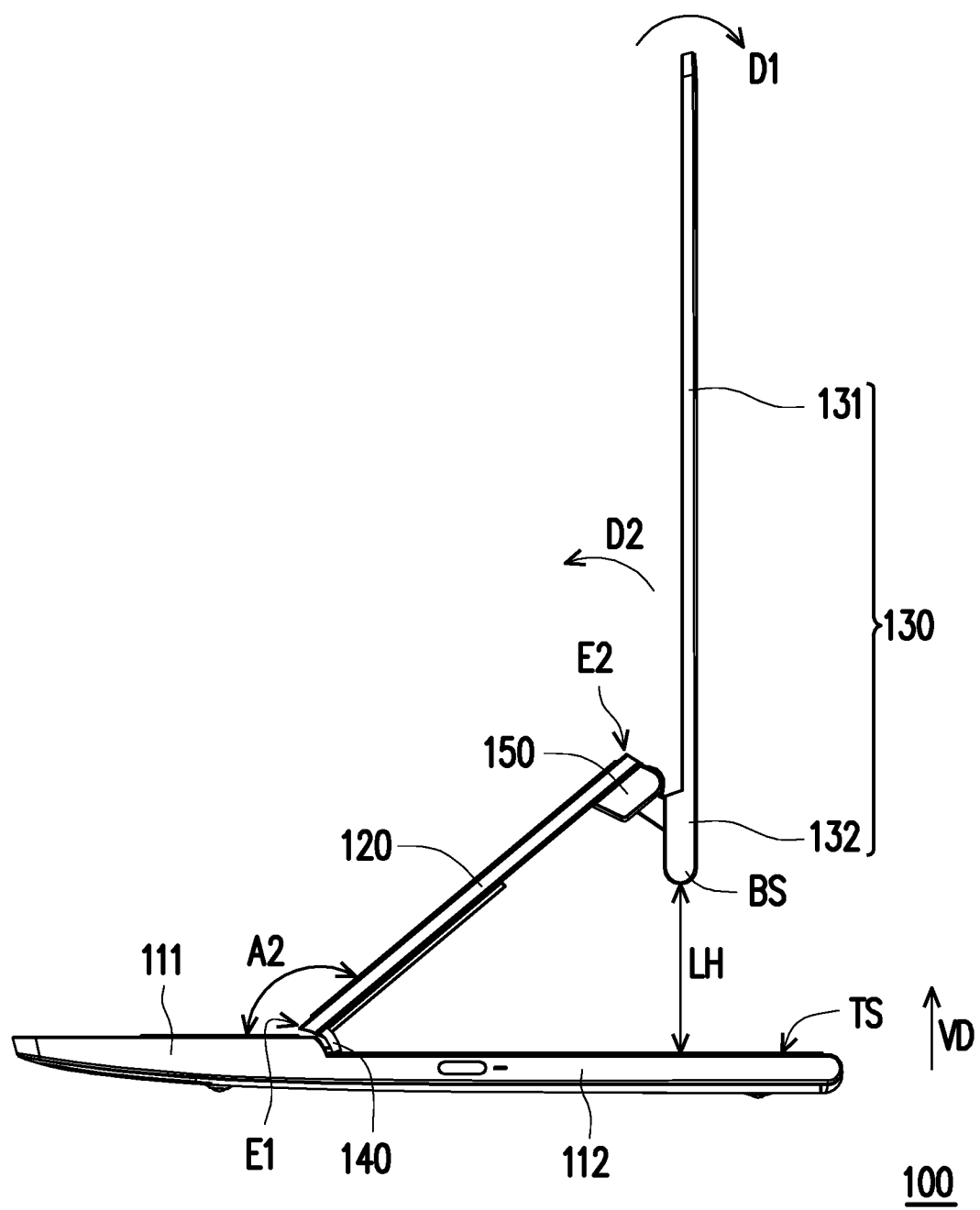
FIG. 1D is a side-view planar schematic diagram of a second unfolded state of the notebook computer with a functional body of FIG. 1A.
Figure 1E:
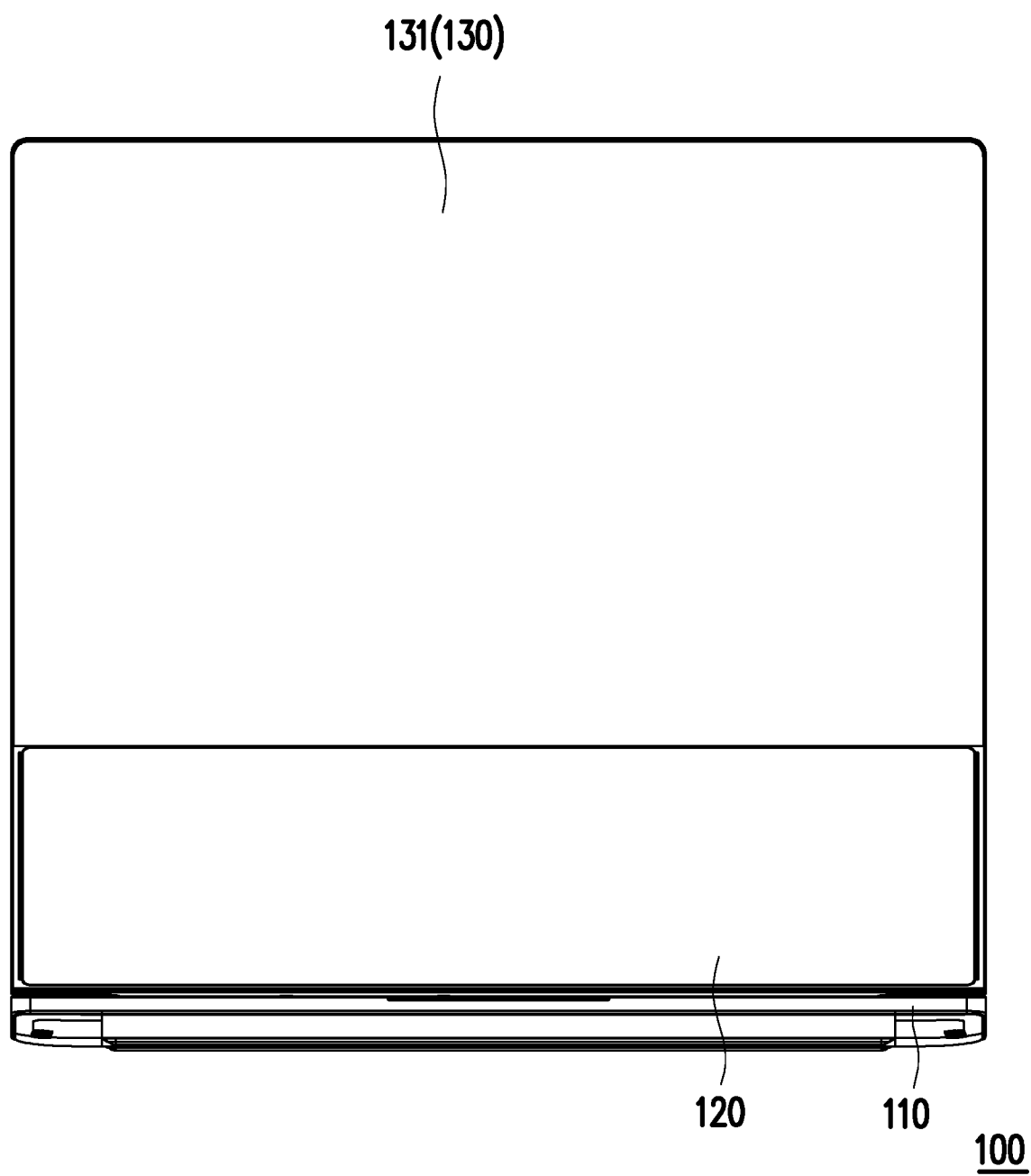
FIG. 1E is a front-view planar schematic diagram of the notebook computer with a functional body of FIG. 1D.

FIG. 1A is a three-dimensional schematic diagram of a folded state of a notebook computer with a functional body according to one embodiment of the present invention. FIG. 1B is a side-view planar schematic diagram of a first unfolded state of the notebook computer with a functional body of FIG. 1A. FIG. 1C is a front-view planar schematic diagram of the notebook computer with a functional body of FIG. 1B. FIG. 1D is a side-view planar schematic diagram of a second unfolded state of the notebook computer with a functional body of FIG. 1A. FIG. 1E is a front-view planar schematic diagram of the notebook computer with a functional body of FIG. 1D.

Referring to FIGS. 1A, 1B and 1C, the notebook computer 100 with a functional body of the present embodiment is adapted to be switched to various use modes, so that a user can freely adjust the modes according to a use requirement or a placement environment to allow the notebook computer to adapt to various use situations.

The notebook computer 100 with a functional body of the present invention includes a host 110, a functional body 120 and a display body 130.

The host 110 has a keyboard portion 111 and a receiving portion 112. A height difference DF is formed between the keyboard portion 111 and the receiving portion 112, and the top surface of the keyboard portion 111 is higher than the top surface TS of the receiving portion 112. In addition, elements such as a computing core, a storage unit and a power supply unit are all disposed in an internal space (not shown in the figure) of the host 110, and the keyboard portion 111 is electrically coupled to the computing core and configured to input an instruction to the computing core.

The functional body 120 has a first end E1 and a second end E2. The first end E1 is in pivot connection to the keyboard portion 111 of the host 110, so that the functional body 120 is adapted to be rotated relative to the receiving portion 112.

The display body 130 has a display portion 131 and a base 132. The second end E2 of the functional body 120 is in pivot connection to the base 132 of the display body 130, and the display body 130 is adapted to be rotated relative to the host 110 and the functional body 120. In the steering process, the base 132 is in contact with the receiving portion 112 to switch to a folded state (see FIG. 1A) or a first unfolded state (see FIG. 1B). Further, the functional body 120 is adapted to be rotated relative to the host 110, so that the base 132 of the display body 130 is relatively away from the receiving portion 112 to switch to a second unfolded state (see FIG. 1D).

Referring to FIGS. 1B and 1C, two first torsion structures 140 and two second torsion pivots 150 are also included. The two first torsion structures 140 are connected to the first end E1 of the functional body 120 and the keyboard portion 111 of the host 110, and are oppositely arranged. A first torsion of the two first torsion structures 140 acts between the host 110 and the functional body 120 to support an included angle and orientation between the host 110 and the functional body 120.

Referring to FIGS. 1B and 1C, when the display body 130 is in the first unfolded state, a bottom side BS of the base 132 abuts against the top surface TS of the receiving portion 112, and the bottom side BS of the base 132 is suitable for translating in a reciprocating mode along the top surface TS of the receiving portion 112, thereby adjusting inclination angles of the display body 130 and the host 110.

Further, the second end E2 of the functional body 120 is higher than an upper edge TE of the base 132, so that the functional body 120 shields the base 132 in a direction towards the display body 130 (see FIG. 1C), and the base 132 overlaps the second end E2 of the functional body 120, so that the base 132 is covered to achieve a technical effect of minimizing a border of the display body 130. Therefore, the functional body 120 is integrated with the display portion 131, so as to form a continuous gap-free display structure.

Figure 2A:
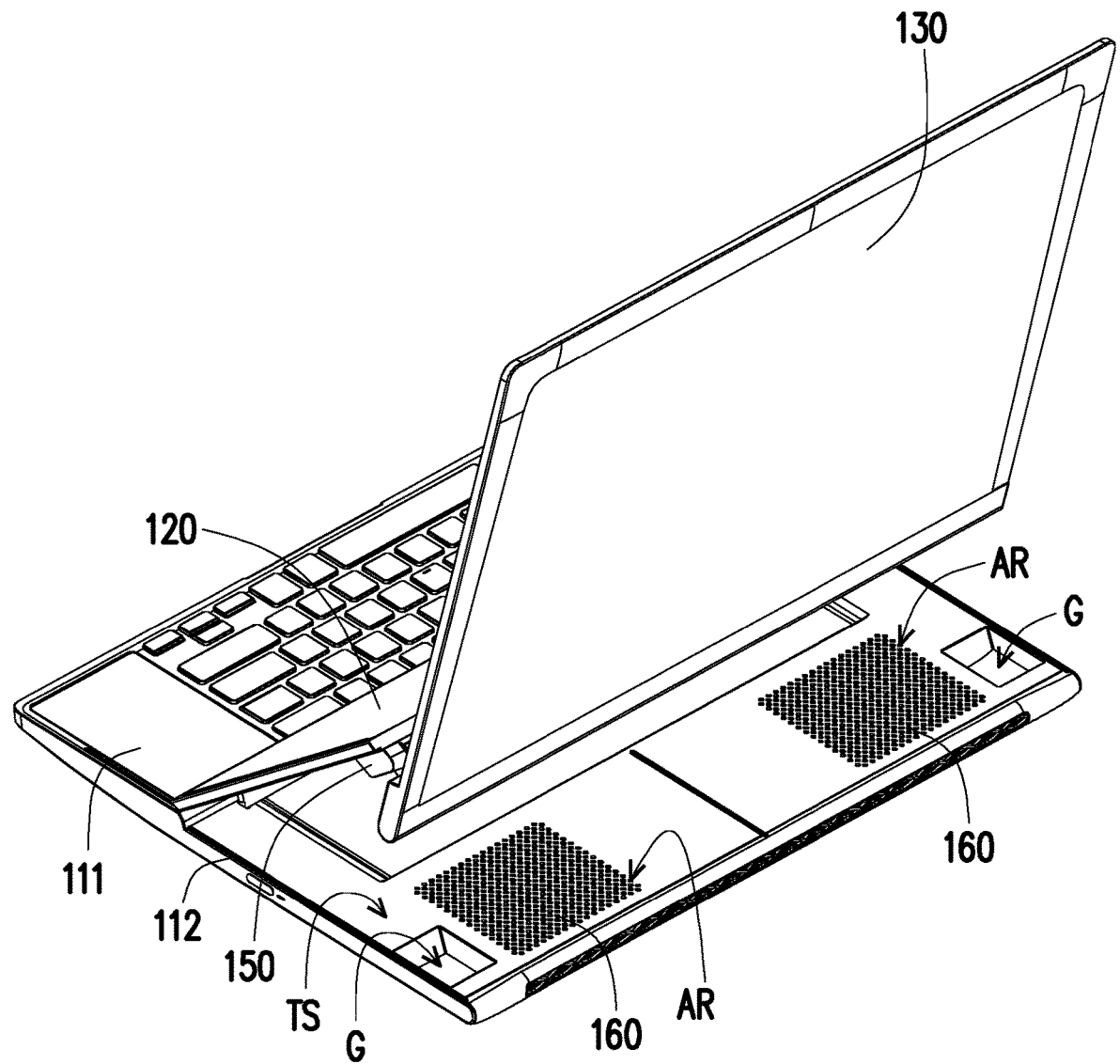
FIG. 2A is a three-dimensional schematic diagram of the notebook computer with a functional body of FIG. 1D.
Figure 2B:
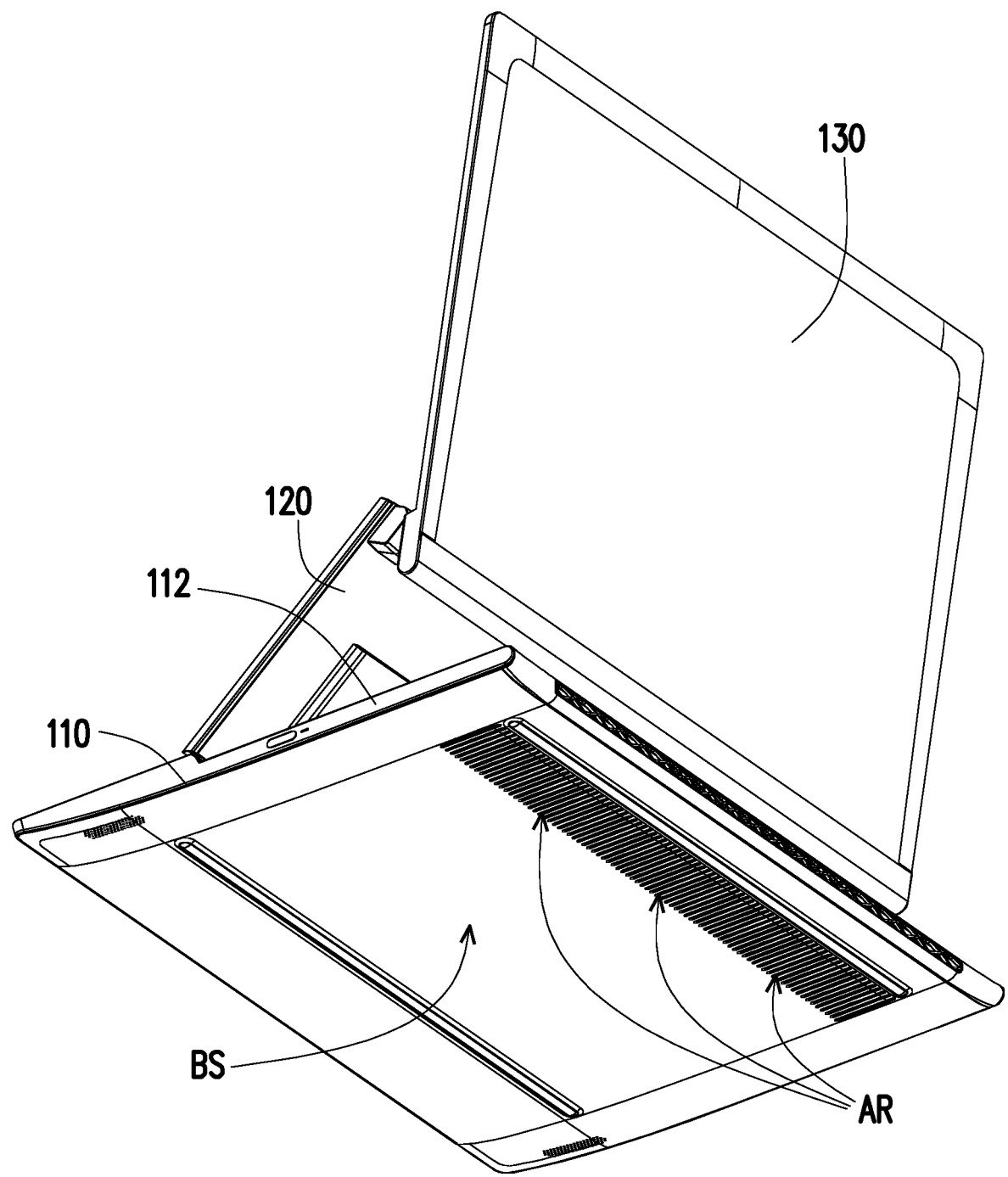
FIG. 2B is a three-dimensional schematic diagram of the notebook computer with a functional body of FIG. 1D in another direction.
Figure 2C:
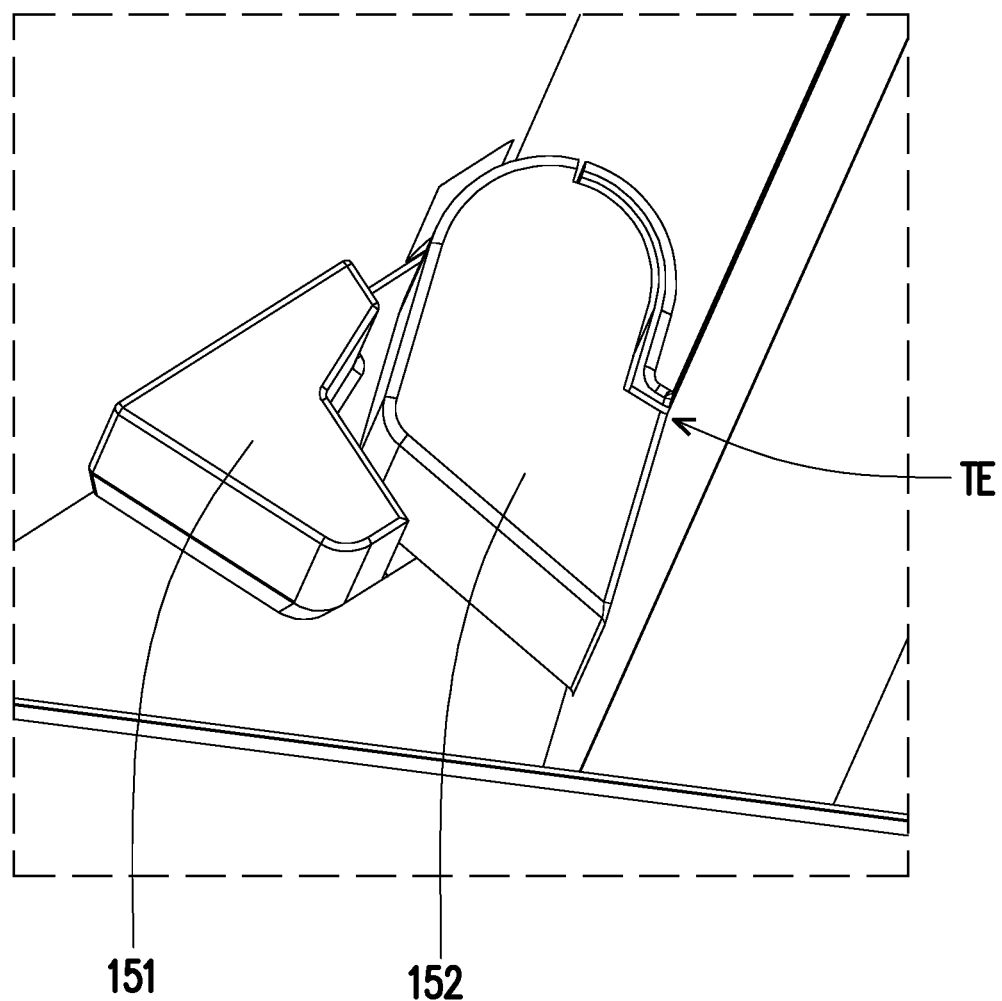
FIG. 2C is an enlarged diagram of part of the structure of the notebook computer with a functional body of FIG. 2A.

FIG. 2A is a three-dimensional schematic diagram of the notebook computer with a functional body of FIG. 1D. FIG. 2B is a three-dimensional schematic diagram of the notebook computer with a functional body of FIG. 1D in another direction. FIG. 2C is an enlarged diagram of part of the structure of the notebook computer with a functional body of FIG. 2A.

Referring to FIGS. 2A and 2C, the two second torsion pivots 150 are connected to the second end E2 of the functional body 120 and the base 132 of the display body 130. A second torsion of the second torsion pivots 150 acts between the functional body 120 and the display body 130 to support an included angle and orientation between the functional body 120 and the display body 130. Further, a top surface TS of the receiving portion 112 has two grooves G oppositely disposed. In the folded state (see FIG. 1A), the two second torsion pivots 150 are respectively located in the corresponding two grooves G. In addition, the two second torsion pivots 150 are respectively received in the two grooves G, so that the second torsion pivot 150 can be prevented from being exposed between the display body 130 and the main body 110, thereby achieving the aim of improving the appearance and reducing the thickness of the whole machine. In addition, when the notebook computer 100 with a functional body is switched to the folded state, the functional body 120 is disposed on the top surface TS of the receiving portion 112, and the display body 130 covers the keyboard portion 111 of the host 110 and the functional body 120.

Further, referring to FIGS. 2C and 1B, each of the second torsion pivots 150 has a first member 151 and a second member 152 which are in pivot connection to each other. Each of the first members 151 is disposed on the second end E2 of the functional body 120. The second members 152 are disposed on the upper edge TE of the base 132. In the first unfolded state, the second member 152 has a predetermined distance PD relative to the top surface TS of the receiving portion 112, and the functional body 120 is inclined to the top surface TS of the receiving portion 112.

Referring to FIGS. 1A to 1B, when the notebook computer 100 with a functional body is switched from the folded state to the first unfolded state, the display body 130 is unfolded towards a first rotation direction D1 relative to the host 110. The functional body 120 is unfolded towards a second rotation direction D2 opposite to the first rotation direction D1 relative to the host 110, so that the base 132 of the display body 130 is located between the functional body 120 and the receiving portion 112. The functional body 120 is relatively away from the receiving portion 112 and forms a second included angle A2 from 0 degree to 80 degrees with the keyboard portion 111.

In detail, when the notebook computer is switched to the first unfolded state, the base 132 abuts against the receiving portion 112, and a first included angle A1 from 80 degrees to 135 degrees is formed between the display body 130 and the host 110.

Referring to FIGS. 1B and 1D, when the notebook computer 100 with a functional body is switched from the first unfolded state to the second unfolded state, the display body 130 is relatively away from the receiving portion 112 of the host 110 along a vertical direction VD, so that a lifted height LH is formed between the base 132 and the receiving portion 112, and a second angle A2 from 0 degree and 80 degrees is formed between the functional body 120 and the keyboard portion 111 of the host 110. The second angle A2 in the second unfolded state is less than the second angle A2 in the first unfolded state.

Referring to FIGS. 2A and 2B, at least one heat dissipation module 160 (two heat dissipation modules are shown in FIGS. 2A and 2B) is included. The two heat dissipation modules 160 are disposed on the receiving portion 112 and face the functional body 120. In the first unfolded state or the second unfolded state, the two heat dissipation modules 160 are suitable for extracting hot air AR from the top surface TS of the receiving portion 112 and discharging it from the bottom surface BS, or the two heat dissipation modules 160 are suitable for sucking cold air AR from the bottom surface BS of the receiving portion 112 and discharging it from the top surface TS to blow to the functional body 120. Both of the above methods can achieve the heat dissipation and cooling effect on the functional body 120.

In the present embodiment, the functional body 120 is, for example, a display panel, a touch board, a touch panel or a virtual keyboard, and has an image output function, an instruction input function, a touch function and the like. In other embodiments, the functional body 120 further includes a wireless charging module, a loudspeaker or a radio apparatus to wirelessly charge an external electronic device such as a smart phone or a tablet.

Figure 3A:
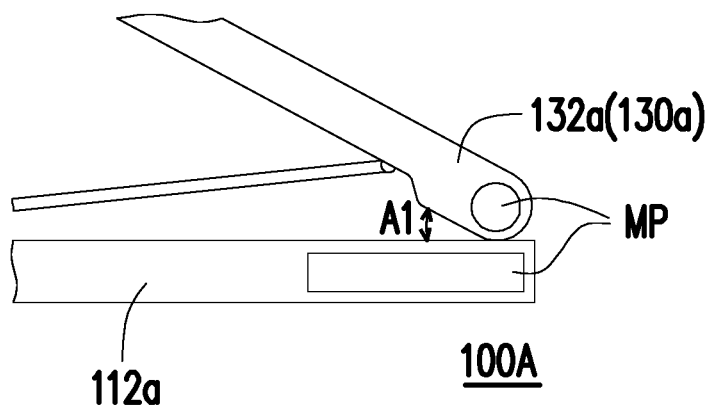
FIGS. 3A to 3C are switching action diagrams of a notebook computer with a functional body, which uses magnetic adsorption, according to another embodiment of the present invention.
Figure 3B:
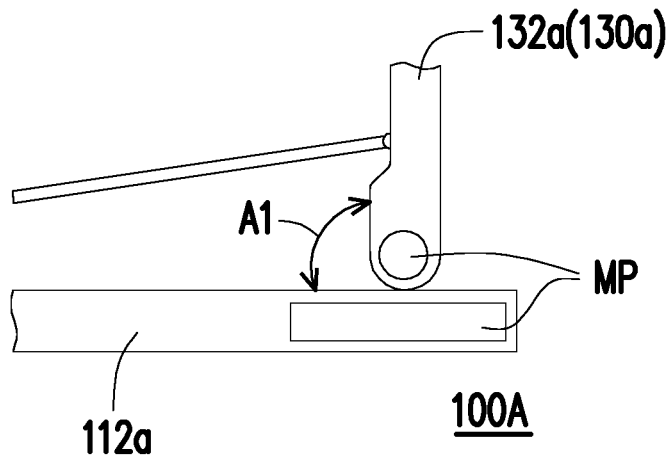
Figure 3C:
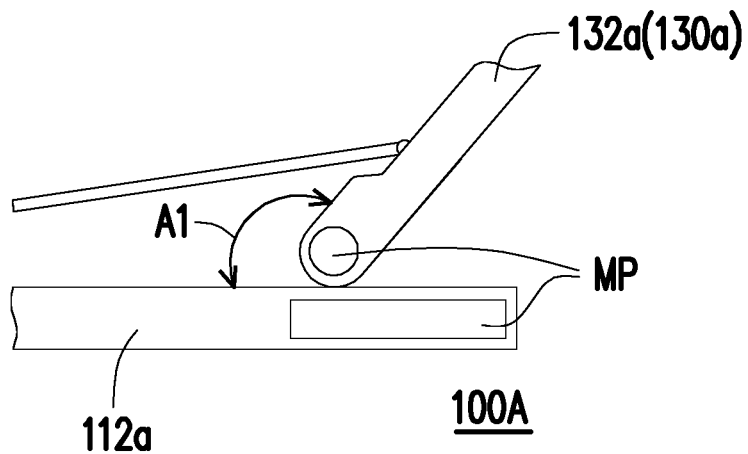

FIGS. 3A to 3C are switching action diagrams of a notebook computer with a functional body, which uses magnetic adsorption, according to another embodiment of the present invention.

Referring to FIGS. 3A to 3C, the notebook computer 100A with a functional body of the present embodiment further includes two magnetic parts MP respectively disposed in the receiving portion 112a of the host 110a and the base 132a of the display body 130a. When the notebook computer is switched to a folded state or a first unfolding state, the base 132a of the display body 130a is adapted to linearly slide along the receiving portion 112a, so that the two magnetic parts MP magnetically attract each other, thereby locating a first included angle A1 between the display body 130a and the host 110a. Through the magnetic attraction, the display body 130a can be prevented from deviating from the host.

Figure 4A:
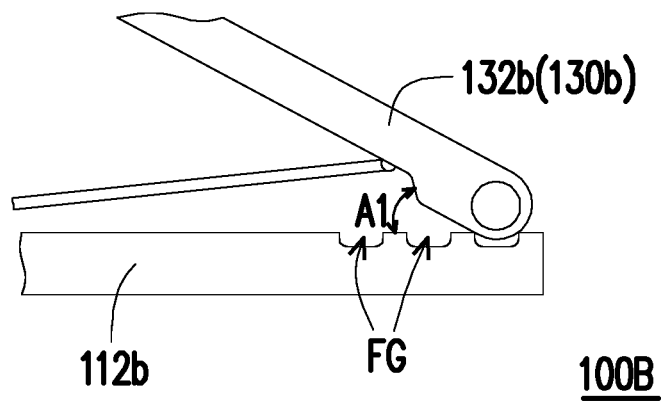
FIGS. 4A to 4C are switching action diagrams of a notebook computer with a functional body, which uses concave-convex matching, according to another embodiment of the present invention.
Figure 4B:
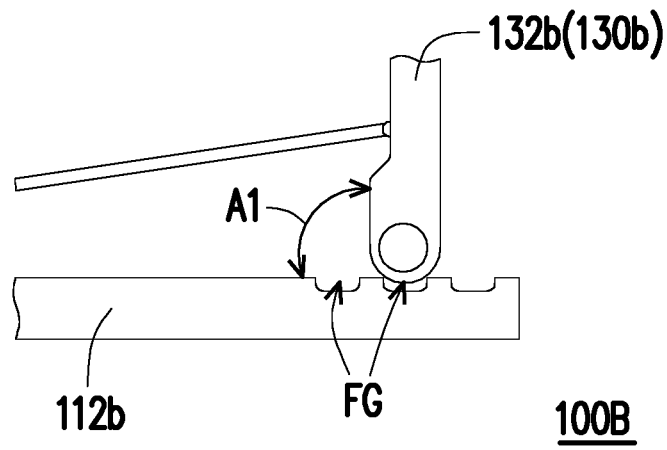
Figure 4C:
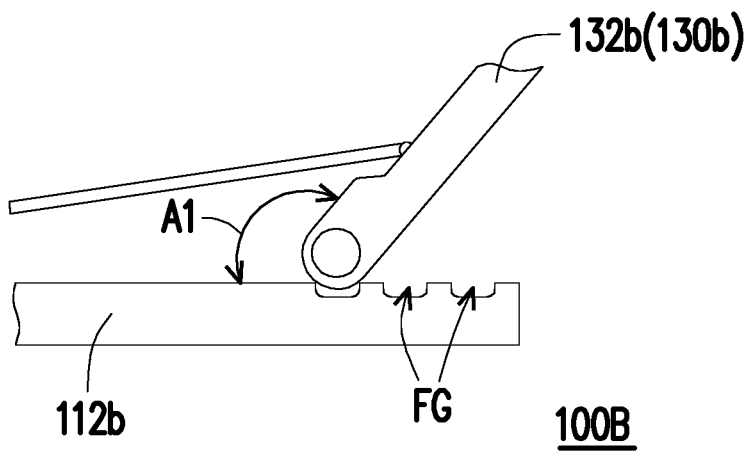

FIGS. 4A to 4C are switching action diagrams of a notebook computer with a functional body, which uses concave-convex matching, according to another embodiment of the present invention.

Referring to FIGS. 4A to 4C, a plurality of fastening grooves FG are formed in a receiving portion 112b of the notebook computer 100B with a functional body. When the notebook computer is switched to a first unfolded state, a base 132b of a display body 130b is fastened to one of the plurality of fastening grooves FG, and a first included angle A1 from 80 degrees to 135 degrees is formed between the display body 130b and a host 110b. Through the concave-convex matching, the display body 130b can be prevented from deviating from the host 110b.

Figure 5A:
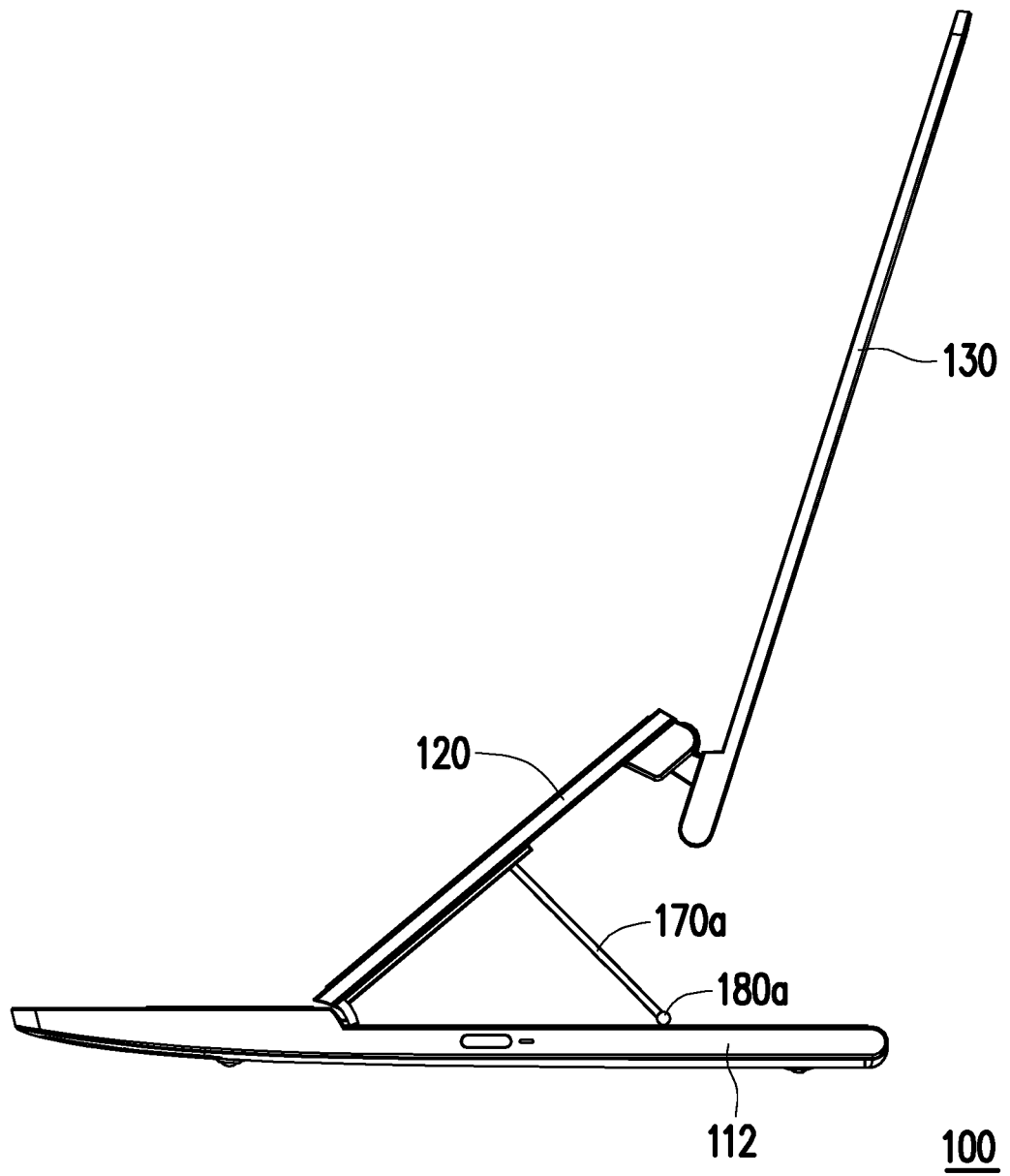
FIG. 5A is a side-view planar schematic diagram of a notebook computer with a functional body, which uses a supporting plate, according to another embodiment of the present invention.
Figure 5B:
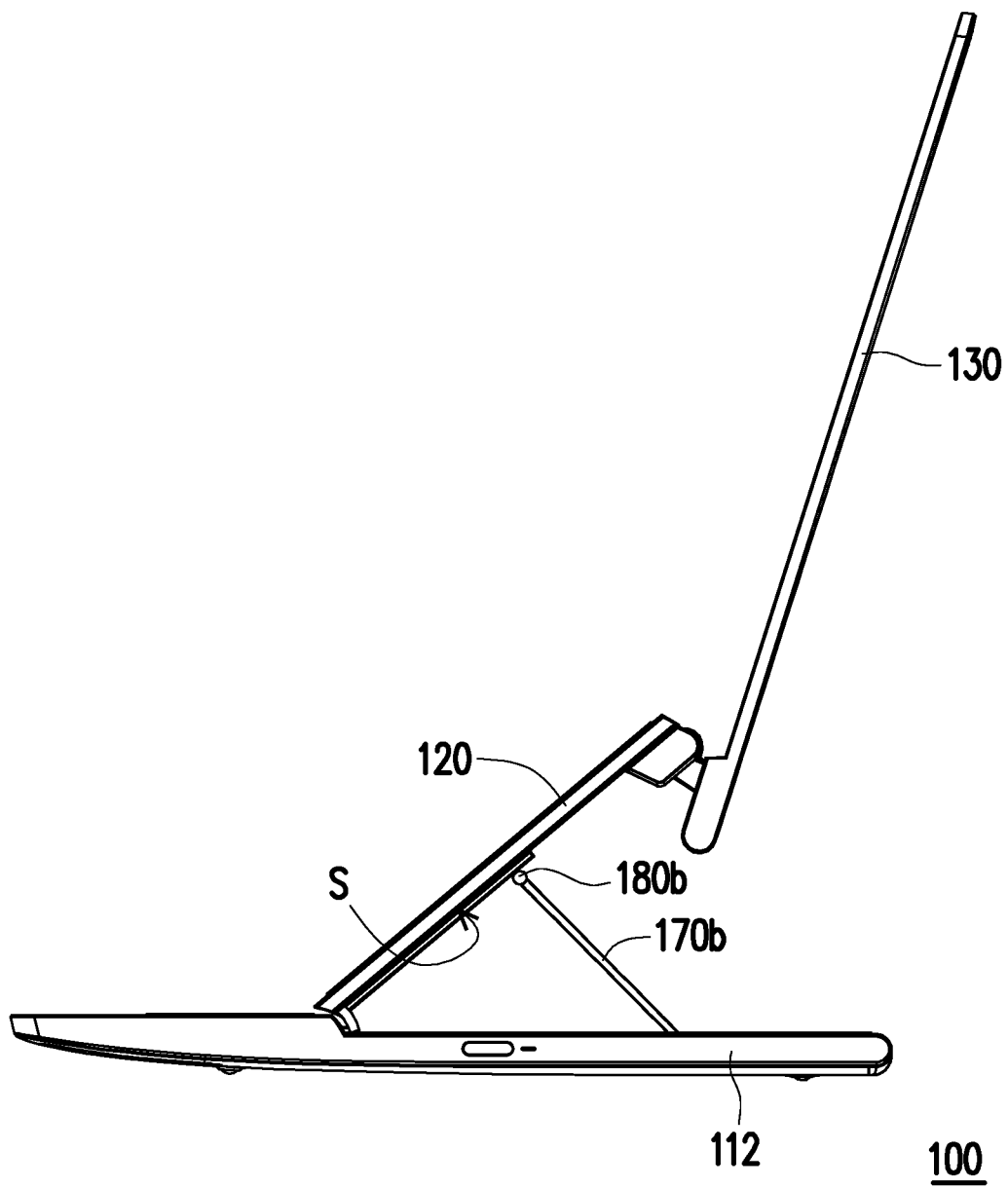
FIG. 5B is a side-view planar schematic diagram of a notebook computer with a functional body, which uses a supporting plate, according to another embodiment of the present invention.

FIG. 5A is a side-view planar schematic diagram of a notebook computer with a functional body, which uses a supporting plate, according to another embodiment of the present invention. FIG. 5B is a side-view planar schematic diagram of a notebook computer with a functional body, which uses a supporting plate, according to another embodiment of the present invention.

Referring to FIG. 5A, a supporting plate 170a and a third torsion pivot 180a are also included. The third torsion pivot 180a is connected to the supporting plate 170a and the receiving portion 112. When the notebook computer is switched to the second unfolded state, the supporting plate 170a is adapted to be rotated relative to the receiving portion 112 to abut against the functional body 120, and a third torsion of the third torsion pivot 180a acts between the supporting plate 170a and the receiving portion 112.

Referring to FIG. 5B, a supporting plate 170b and a third torsion pivot 180b are also included. The third torsion pivot 180b is connected to the supporting plate 170b and a bottom surface S facing the host 110 of the functional body 120. When the notebook computer is switched to the second unfolded state, the supporting plate 170b is adapted to be rotated relative to the bottom surface S to abut against the receiving portion 112, and a third torsion of the third torsion pivot 180b acts between the supporting plate 170b and the functional body 120.

Figure 5C:
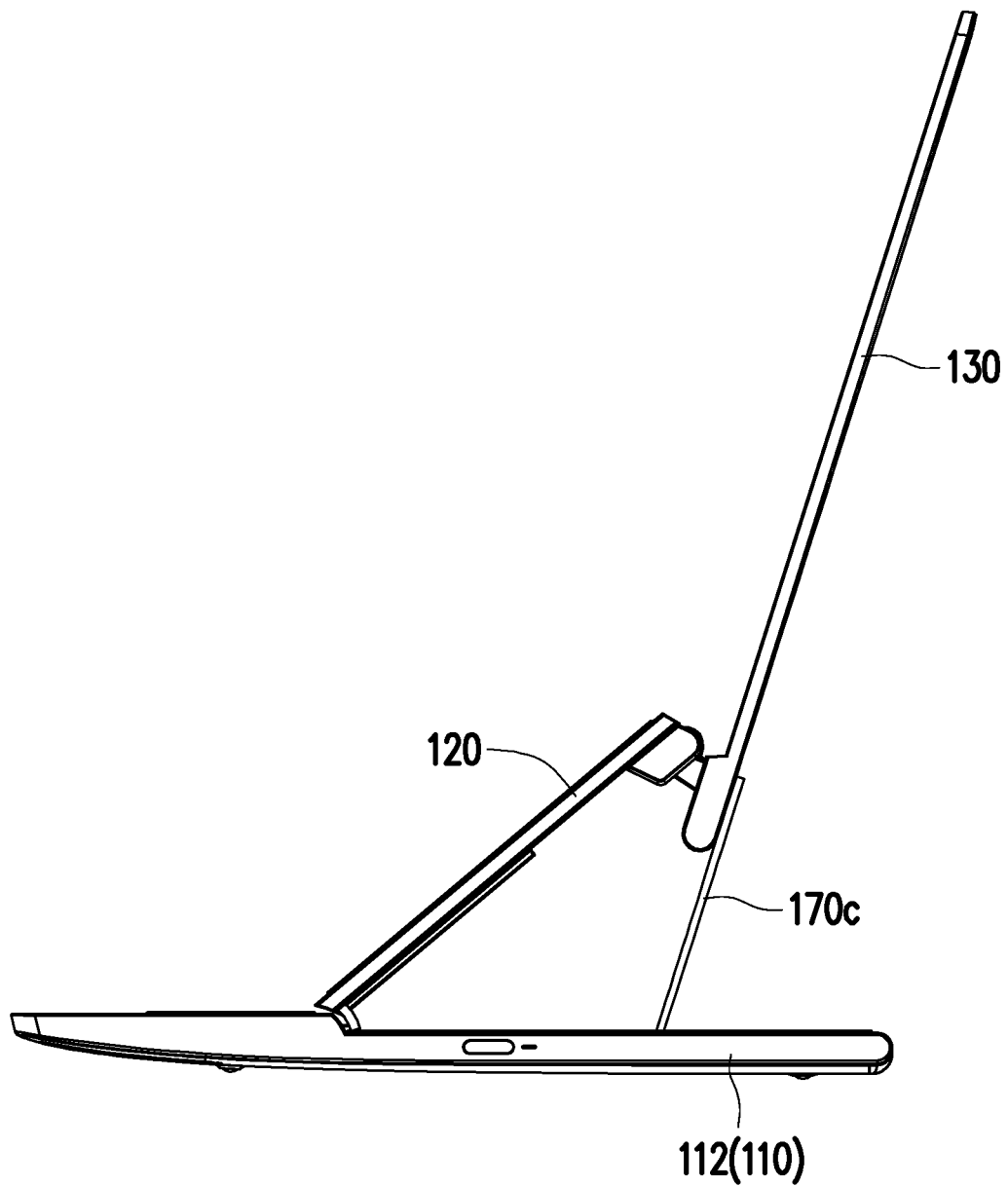
FIG. 5C is a side-view planar schematic diagram of a notebook computer with a functional body, which uses a supporting plate, according to another embodiment of the present invention.

Referring to FIG. 5C, a supporting plate 170c is slidably disposed outside the display body 130. When the notebook computer is switched to a second unfolded state, the supporting plate 170c is adapted to slide relative to the display body 130 and protrudes out of the base 132 to abut against the receiving portion 112 of the host 110.

In short, according to the embodiments of FIGS. 5A to 5C, when the notebook computer 100 with a functional body is switched to the first unfolded state, an extra supporting force is provided through the pivotable or slidable supporting plate, so as to support the display body 130 and the functional body 120 to be away from the host 110 relatively.

Based on the above, according to the notebook computer with a functional body of the present invention, the display body thereof is adapted to be rotated relative to the host and the functional body, and the base of the display body is in contact with the receiving portion of the host to switch to the first unfolded state. This is similar to the use mode of a common notebook, and a difference is that the base can translate along the receiving portion of the host to adjust the angle of the display body, and the display body also drives the functional body to be relatively away from the receiving portion at the same time to allow both the display body and the functional body to slantways face the user, which is contributive to use and operation at a close distance. Further, the functional body is suitable for being continuously steered relative to the host, so that the base of the display body is relatively away from the receiving portion to switch to the second unfolded state. In this state, the horizontal height of the display body is increased, and the user is allowed to horizontally directly watch the display body at a remote distance, so as to correct an incorrect watching posture with the neck bent down and alleviate the phenomenon of ache in the shoulders and neck and injury to the body under long-time use.

Further, the present invention further has the functional body, and provides the extra display body or an operability effect, without depending on an original keyboard portion or an external mouse. The combination of the functional body and the display body may also enlarge an image output range, so as to strengthen the practical feature and the operability effect of the present invention.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A notebook computer with a functional body, comprising:
    a host, comprising a keyboard portion and a receiving portion, wherein a height difference is formed between the keyboard portion and the receiving portion;
    a functional body, comprising a first end and a second end, wherein the first end is in pivot connection to the keyboard portion of the host;
    a display body, comprising a display portion and a base, wherein the second end of the functional body is in pivot connection to the display body,
    wherein the display body is adapted to be rotated relative to the host and the functional body, so that the base is in contact with the receiving portion to switch to a folded state or a first unfolded state; and the functional body is adapted to be rotated relative to the host, so that the base of the display body is relatively away from the receiving portion to switch to a second unfolded state; and
    two second torsion pivots,
    wherein the second torsion pivots are connected to the second end and the base, and a second torsion of the second torsion pivots acts between the functional body and the display body,
    wherein a top surface of the receiving portion comprises a plurality of grooves, and only in the folded state, the second torsion pivots are respectively located in the corresponding grooves,
    wherein the second end of the functional body is higher than an upper edge of the base, so that the functional body shields the base in a direction towards the display body, and the base overlaps the second end of the functional body.

2. The notebook computer with a functional body according to claim 1, further comprising two first torsion structures, wherein the first torsion structures are connected to the first end and the keyboard portion; a first torsion of the first torsion structures acts between the host and the functional body.

3. The notebook computer with a functional body according to claim 2, wherein each of the second torsion pivots comprises a first member and a second member which are in pivot connection to each other, the first member is disposed on the second end of the functional body, the second member is disposed on the base, in the first unfolded state, the second member comprises a predetermined distance relative to the receiving portion, and the functional body is inclined to the top surface of the receiving portion.

4. The notebook computer with a functional body according to claim 1, further comprising a supporting plate and a third torsion pivot, wherein the third torsion pivot is connected to the supporting plate and the receiving portion; when the base is switched to a second unfolded state, the supporting plate is adapted to be rotated relative to the receiving portion to abut against the functional body, and a third torsion of the third torsion pivot acts between the supporting plate and the receiving portion.

5. The notebook computer with a functional body according to claim 1, further comprising a supporting plate and a third torsion pivot, wherein the third torsion pivot is connected to the supporting plate and a bottom surface, facing the host, of the functional body; when the notebook computer is switched to a second unfolded state, the supporting plate is adapted to be rotated relative to the bottom surface to abut against the receiving portion, and a third torsion of the third torsion pivot acts between the supporting plate and the functional body.

6. The notebook computer with a functional body according to claim 1, further comprising a supporting plate, slidably disposed on the display body, wherein when the notebook computer is switched to a second unfolded state, the supporting plate is adapted to slide relative to the display body and protrudes out of the base to abut against the receiving portion of the host.

7. The notebook computer with a functional body according to claim 1, further comprising two magnetic parts, respectively disposed on the receiving portion of the host and the base of the display body, wherein when the notebook computer is switched to the folded state or the first unfolded state, the two magnetic parts magnetically attract each other.

8. The notebook computer with a functional body according to claim 1, wherein when the notebook computer is switched to the first unfolded state, the base abuts against the receiving portion.

9. The notebook computer with a functional body according to claim 1, wherein when the notebook computer is switched to the first unfolded state or the second unfolded state, a second included angle from 0 degree to 80 degrees is formed between the functional body and the host.

10. The notebook computer with a functional body according to claim 1, wherein when the notebook computer is switched to the folded state, the functional body is disposed on the receiving portion, and the display body covers the keyboard portion of the host and the functional body.

11. The notebook computer with a functional body according to claim 1, wherein when the notebook computer is switched from the folded state to the first unfolded state, the display body is unfolded towards a first rotation direction relative to the host; the functional body is unfolded towards a second rotation direction opposite to the first rotation direction relative to the host, so that the base of the display body is located between the functional body and the receiving portion; and the functional body is relatively away from the receiving portion.

12. The notebook computer with a functional body according to claim 11, wherein when the notebook computer is switched from the first unfolded state to the second unfolded state, the display body is relatively away from the host along a vertical direction, so that a lifted height is formed between the base and the receiving portion, and the second included angle in the second unfolded state is less than the second included angle in the first unfolded state.

13. The notebook computer with a functional body according to claim 1, wherein the functional body is a display panel, a touch board or a touch panel, a virtual keyboard, a wireless charging module, a loudspeaker or a radio apparatus.

14. The notebook computer with a functional body according to claim 1, further comprising at least one heat dissipation module, disposed on the receiving portion and facing the functional body.

15. A notebook computer with a functional body, comprising:
- a host, comprising a keyboard portion and a receiving portion, wherein a height difference is formed between the keyboard portion and the receiving portion;
- a functional body, comprising a first end and a second end, wherein the first end is in pivot connection to the keyboard portion of the host;
- a display body, comprising a display portion and a base, wherein the second end of the functional body is in pivot connection to the display body,
- wherein when the display body is in a first unfolded state, a bottom side of the base abuts against a top surface of the receiving portion, and the base is adapted to translate along the top surface of the receiving portion; and
- two second torsion pivots,
- wherein the second torsion pivots are connected to the second end and the base, and a second torsion of the second torsion pivots acts between the functional body and the display body,
- wherein a top surface of the receiving portion comprises a plurality of grooves, and only in the folded state, the second torsion pivots are respectively located in the corresponding grooves,
- wherein the second end of the functional body is higher than an upper edge of the base, so that the functional body shields the base in a direction towards the display body, and the base overlaps the second end of the functional body.

16. The notebook computer with a functional body according to claim 15, further comprising two first torsion structures, wherein the first torsion structures are connected to the first end and the keyboard portion; a first torsion of the first torsion structures acts between the host and the functional body.

17. The notebook computer with a functional body according to claim 15, wherein the display body is adapted to be rotated relative to the host and the functional body, so that the bottom side of the base is in contact with the receiving portion to switch to a first unfolded state; and the functional body is adapted to be rotated relative to the host, so that the bottom side of the base is relatively away from the receiving portion to switch to a second unfolded state.

* * * * *